US012765450B2

(12) United States Patent
Kawai

(10) Patent No.: US 12,765,450 B2
(45) Date of Patent: Oct. 20, 2026

(54) PATH SETTING APPARATUS, PATH SETTING METHOD, AND NON-TRANSITORY COMPUTER-READABLE STORAGE MEDIUM

(71) Applicant: HONDA MOTOR CO., LTD., Tokyo (JP)

(72) Inventor: Toru Kawai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1203 days.

(21) Appl. No.: 17/477,895

(22) Filed: Sep. 17, 2021

(65) Prior Publication Data

US 2022/0110244 A1 Apr. 14, 2022

(30) Foreign Application Priority Data

Oct. 14, 2020 (JP) ................................ 2020-173450

(51) Int. Cl.
*A01D 34/00* (2006.01)
*A01D 101/00* (2006.01)
*G05D 1/00* (2024.01)

(52) U.S. Cl.
CPC ......... *A01D 34/008* (2013.01); *G05D 1/0219* (2013.01); *G05D 1/0278* (2013.01); *A01D 2101/00* (2013.01)

(58) Field of Classification Search
CPC ... E02F 9/2045; G05D 2105/15; G05D 1/648; B60W 2300/15; G01S 5/0072; H04W 4/46; G08G 1/00
See application file for complete search history.

(56) References Cited

U.S. PATENT DOCUMENTS 8,645,016 B2 * 2/2014 Durkos ................ G05D 1/0272 701/25
10,959,371 B2 3/2021 Zhou et al.
2018/0215393 A1 8/2018 Miyakubo et al.
2018/0359916 A1 12/2018 Zhou et al.
2019/0265725 A1 * 8/2019 Shao .................... G05D 1/0274
2019/0369640 A1 * 12/2019 He ......................... G06Q 10/04
(Continued)

FOREIGN PATENT DOCUMENTS

CN 107703934 A * 2/2018 ......... G06Q 10/0635
EP 3696575 A1 * 8/2020 ............. G01S 19/07
(Continued)

OTHER PUBLICATIONS

CN107703934A—English Translation (Year: 2026).*
(Continued)

*Primary Examiner* — Erin M Piateski
*Assistant Examiner* — Eisen Yim
(74) *Attorney, Agent, or Firm* — THOMAS | HORSTEMEYER, LLP

(57) ABSTRACT

A path setting apparatus for an autonomous working machine that autonomously conducts a work while moving in a working site with recognizing a current location based on a GNSS signal, includes an obtaining unit configured to obtain information regarding reception strength of the GNSS signal on the working site, and a setting unit configured to set a movement path of the autonomous working machine in the working site based on the information obtained by the obtaining unit.

13 Claims, 13 Drawing Sheets

(56) References Cited

U.S. PATENT DOCUMENTS

| | | | | |
|---|---|---|---|---|
| 2020/0110423 | A1* | 4/2020 | Antich | G05D 1/0287 |
| 2020/0379463 | A1 | 12/2020 | Muro et al. | |
| 2021/0227744 | A1 | 7/2021 | Zhou et al. | |
| 2022/0053988 | A1* | 2/2022 | Larose | G05D 1/0219 |
| 2022/0155407 | A1* | 5/2022 | Ross | G01C 21/206 |

FOREIGN PATENT DOCUMENTS

| | | | | |
|---|---|---|---|---|
| JP | H07-104847 | A | | 4/1995 |
| JP | H07-104848 | A | | 4/1995 |
| JP | H09-062353 | A | | 3/1997 |
| JP | 2008046873 | A | * | 2/2008 |
| JP | 2014054335 | A | * | 3/2014 |
| JP | 2017-117257 | A | | 6/2017 |
| JP | 2020-018236 | A | | 2/2020 |
| JP | 2020-031596 | A | | 3/2020 |
| JP | 2020-051852 | A | | 4/2020 |
| JP | 2020-091201 | A | | 6/2020 |
| JP | 2020-110158 | A | | 7/2020 |
| WO | 2015/147111 | A1 | | 10/2015 |
| WO | 2019/167210 | A1 | | 9/2019 |

OTHER PUBLICATIONS

JP2014054335A—English Translation (Year: 2026).*

Japanese Office Action for Japanese Patent Application No. 2020-173450 mailed May 9, 2023 (partially translated).

* cited by examiner

PATH SETTING APPARATUS, PATH SETTING METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2020-173450 filed on Oct. 14, 2020, the entire disclosure of which is incorporated herein by reference.

BACKGROUND OF THE INVENTION

Field of the Invention

The present invention relates to a path setting technique for an autonomous working machine.

Description of the Related Art

There has been proposed a working machine that recognizes its own current location with use of global navigation satellite system (GNSS) signals and that autonomously moves to conduct a work (see, for example, Japanese Patent Laid-Open No. 2020-110158).

An area where reception strength of the GNSS signals received by a working machine decreases can be present within a working site due to a factor such as a building near the working site or a topographical feature (for example, a depressed ground) of the working site. In such an area, it is sometimes difficult for an autonomous working machine to conduct location recognition with accuracy, and the autonomous working machine moves on an unintended path when moving in the working site, in some cases.

SUMMARY OF THE INVENTION

The present invention has an object to provide a technique capable of reducing an influence of a reception situation of a GNSS signal with regard to movements of an autonomous working machine.

According to an aspect of the present invention, there is provided a path setting apparatus for an autonomous working machine that autonomously conducts a work while moving in a working site with recognizing a current location based on a GNSS signal, the path setting apparatus comprising: an obtaining unit configured to obtain information regarding reception strength of the GNSS signal on the working site; and a setting unit configured to set a movement path of the autonomous working machine in the working site based on the information obtained by the obtaining unit.

Further features of the present invention will become apparent from the following description of exemplary embodiments with reference to the attached drawings.

DESCRIPTION OF THE EMBODIMENTS

Figure 1:
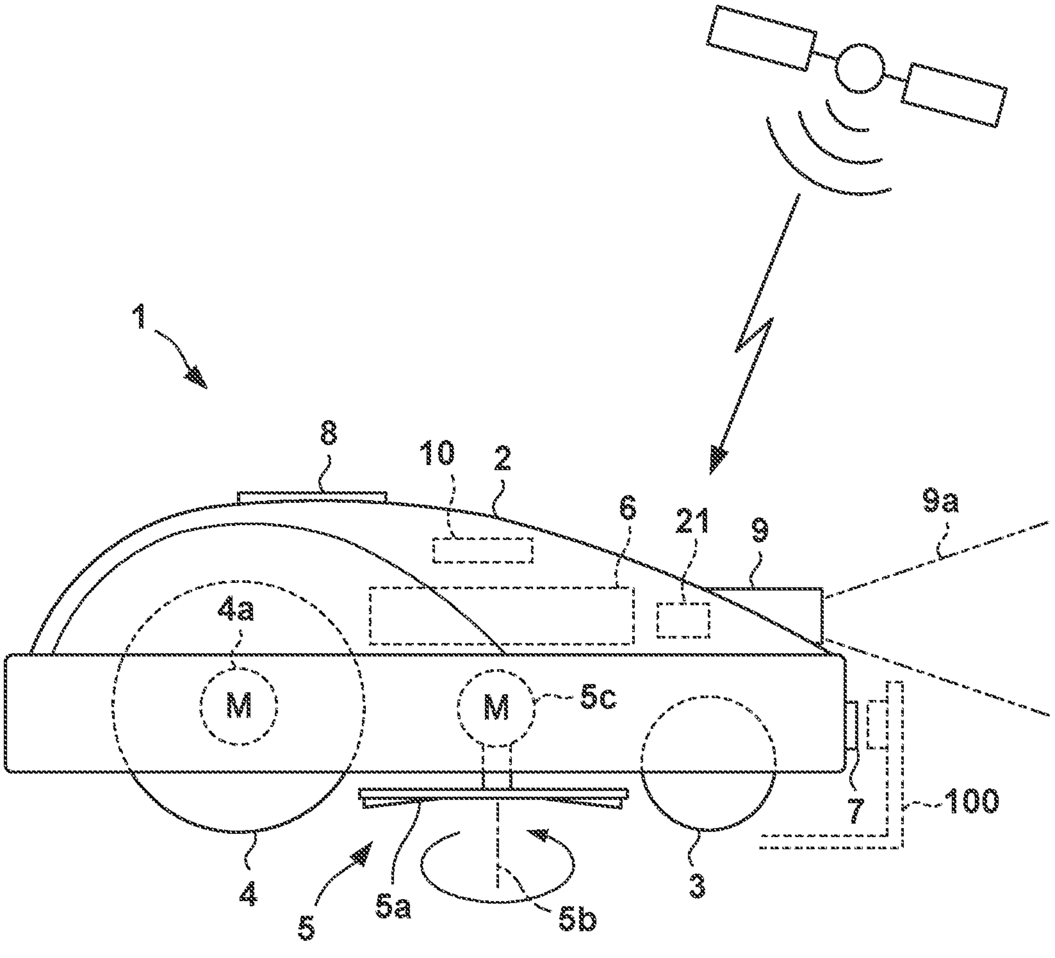
FIG. 1 is a side view of an autonomous working machine according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Outline of Autonomous Working Machine

FIG. 1 is a side view of an autonomous working machine 1, to which the present invention is applicable. The working machine 1 in the present embodiment is a lawn mower that conducts a lawn mowing work while moving in a working site (lawn ground). However, the present invention is also applicable to other types of autonomous working machines such as snow blowers, cultivators, and road paving machines.

The working machine 1 is a four-wheeled vehicle in which left and right front wheels 3 and left and right rear wheels 4 are supported by a vehicle body 2. The left and right rear wheels 4 are driving wheels, and move the working machine 1 on the working site. The rear wheels 4 are each provided with a driving mechanism with a motor 4*a* as a drive source, and the left and right rear wheels 4 are independently subject to rotation control. The left and right rear wheels 4 are independently subject to the rotation control, so that a traveling direction of the working machine 1 becomes controllable. The left and right front wheels 3 are provided to be freely rotatable.

The working machine 1 includes a working unit 5. The working unit 5 is a mechanism that conducts the lawn mowing work in a working site. The working unit 5 includes a rotary cutter 5_a_ and a drive mechanism (not illustrated) that rotates the rotary cutter 5_a_ around an axis 5_b_ extending substantially vertically with a motor 5_c_ used as a drive source.

The rotary cutter 5_a_ is disposed below the vehicle body 2 at a central position (between the front wheels 3 and the rear wheels 4) in a front-and-rear direction of the working machine 1. The rotary cutter 5_a_ in the present embodiment is provided with a blade (cutting edge) so as to cut the lawn in either case where the rotation direction is a forward rotation or a reverse rotation. The working unit 5 may include a lifting mechanism that changes the vertical position of the rotary cutter 5_a_. With the above configuration, it is possible for the working unit 5 to conduct the lawn mowing work, while the front wheels 3 and the rear wheels 4 are moving the working machine 1.

An imaging device 9 is provided at a front part of the vehicle body 2. The imaging device 9 is a camera including an imaging sensor such as a CCD sensor or a CMOS sensor, and an optical system such as a lens. In a case of the present embodiment, an imaging range 9_a_ of the imaging device 9 is a forward side of the working machine 1. However, the imaging range 9_a_ is not limited to this, and a 360-degree camera may be adopted as the imaging device 9.

An operation panel 8 that receives an operation input of a user is provided at the top of the vehicle body 2. The operation panel 8 may be provided with a display unit, and a touch panel display may be adopted as the operation panel 8. The user is able to input various types of information of the working machine 1 from the operation panel 8.

The working machine 1 includes a battery 6 as its power source. The battery 6 supplies electric power to electric loads, such as the motors 4_a_ and 5_c_ and the imaging device 9, included in the working machine 1. The battery 6 is chargeable in a charging station 100, and the vehicle body 2 is provided with a connector 7 for electrically connecting the working machine 1 with the charging station 100.

The working machine 1 includes a GNSS receiver 21 that receives GNSS signals transmitted from an artificial satellite. The current location (for example, latitude, longitude, altitude, and the like) of the working machine 1 is recognized, based on the GNSS signals that have been received.

Figure 2:
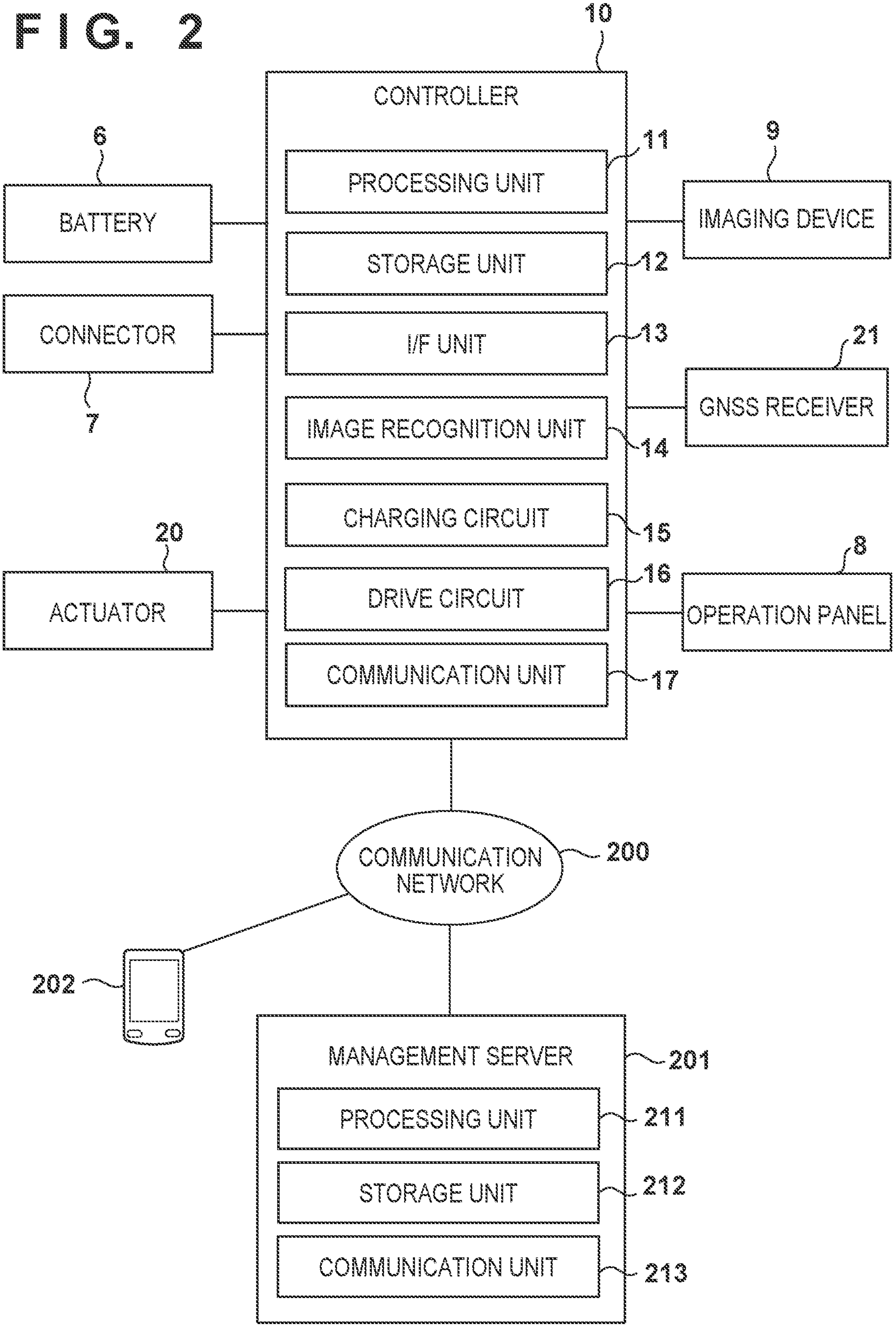
FIG. 2 is a block diagram illustrating a controller of the autonomous working machine of FIG. 1.

The working machine 1 includes a controller 10 that controls its operation. FIG. 2 is a block diagram illustrating configurations of the controller 10 and its periphery.

The controller 10 includes a processing unit 11, a storage unit 12 such as a RAM, a ROM, and the like, and an interface unit (I/F unit) 13 that relays transmission and reception of signals between an external device and the processing unit 11. The processing unit 11 is a processor represented by CPU, and executes a program stored in the storage unit 12 to control an actuator 20 and the imaging device 9. The actuator includes the motors 4_a_ and 5_c_. The processing unit 11 controls driving of these motors via a drive circuit 16. In addition, the processing unit 11 obtains information of the current location of the working machine 1 and information of the reception strength (signal strength) of the GNSS signal from the GNSS receiver 21.

The controller 10 also includes an image recognition unit 14 that recognizes contents of an image that has been captured by the imaging device 9. The image recognition unit 14 is, for example, an image processing processor, and analyzes a captured image to specify the type of an object included in the captured image. The image recognition unit 14 may function as an artificial intelligence that has been subject to machine learning specialized for image recognition. The processing unit 11 avoids an obstacle on the working site, or recognizes the charging station 100, based on a recognition result of the image recognition unit 14.

The controller 10 also includes a charging circuit 15 that charges the battery 6. The charging circuit 15 is capable of charging the battery 6 with the electric power supplied from the charging station 100 via the connector 7.

The controller 10 also includes a communication unit 17. The communication unit 17 is capable of wirelessly communicating with a management server 201 or a mobile terminal 202 such as a smartphone via a communication network 200. The management server 201 is a server that manages the state of the working machine 1, and, for example, is capable of managing information of a plurality of working machines 1. The management server 201 is also capable of wirelessly communicating with the mobile terminal 202 via the communication network 200. The mobile terminal 202 is, for example, a terminal of a user (an owner or a work manager of the working site) of the working machine 1, and is capable of receiving information of the working machine 1 from the management server 201. Accordingly, the user is able to monitor the working machine 1 even at a place away from the working machine 1.

The management server 201 includes a processing unit 211, a storage unit 212, and a communication unit 213. The processing unit 211 is a processor represented by CPU, and executes a program stored in the storage unit 212. The storage unit 212 is a storage device such as a ROM, a RAM, or an HDD. The communication unit 213 is a communication device for communicating with the working machine 1 or the mobile terminal 202 via the communication network 200.

Usage Example of Working Machine

Figure 3A:
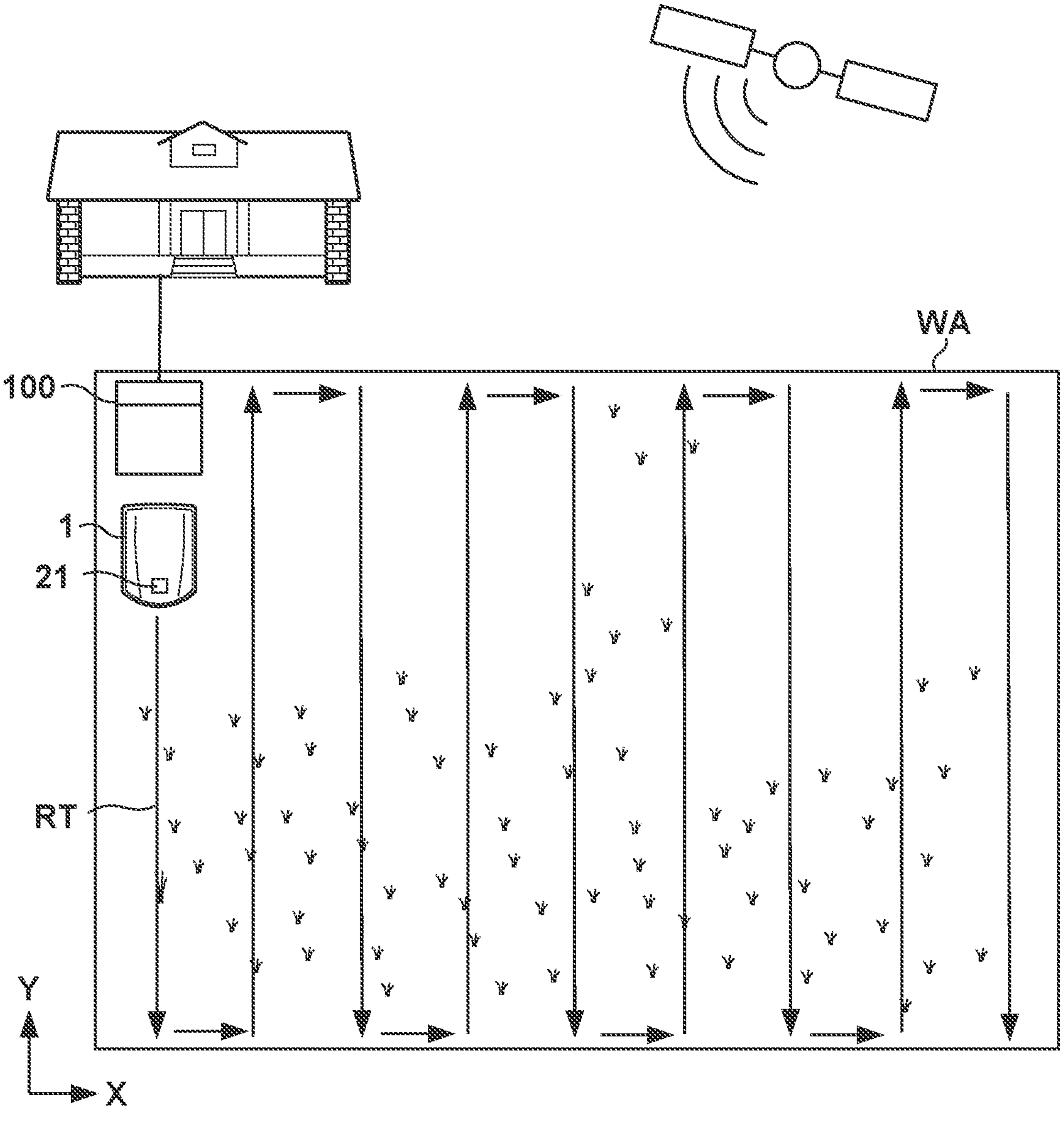
FIG. 3A is a schematic diagram illustrating a usage example of the autonomous working machine of FIG. 1.

FIG. 3A is a schematic diagram illustrating a usage example of the working machine 1. In the drawing, the working machine 1 conducts the lawn mowing work on a working site (lawn ground) WA adjacent to a house. The charging station 100, to which the electric power is supplied from the house, is installed in the working site WA. The working machine 1 starts from the charging station 100, conducts the lawn mowing work on the working site WA, and returns to the charging station 100.

The controller 10 causes the working machine 1 to move in the working site WA to autonomously conduct the lawn mowing work, while recognizing the current location of the working machine 1, based on the GNSS signals received by the GNSS receiver 21. In FIG. 3A, a movement path RT of the working machine 1 is illustrated by arrows.

The movement path RT in the illustrated example is a path in which the working machine 1 is made to move straight, change the course at a land boundary of the working site WA, and move straight again. To be more specific, assuming an orthogonal coordinate X-Y as illustrated in the drawing, the movement path RT is set such that while the working machine 1 is being made to reciprocate in Y direction with the land boundary of the working site WA used as a turning location of the course, the working machine 1 is made to move in X direction by a predetermined cutting width every time making a turn in the course. In this manner, while the working machine 1 is reciprocating in one direction, the working machine 1 moves in a direction that intersects the reciprocating direction, and thus it is possible to conduct the lawn mowing work on the working site WA without omission. Note that in the illustrated example, the angle in the direction that intersects the reciprocating direction is approximately 90 degrees. However, the intersection angle is not limited to 90 degrees, and may be another angle such as 30 degrees or 45 degrees.

Setting of Movement Path

Figure 3B:
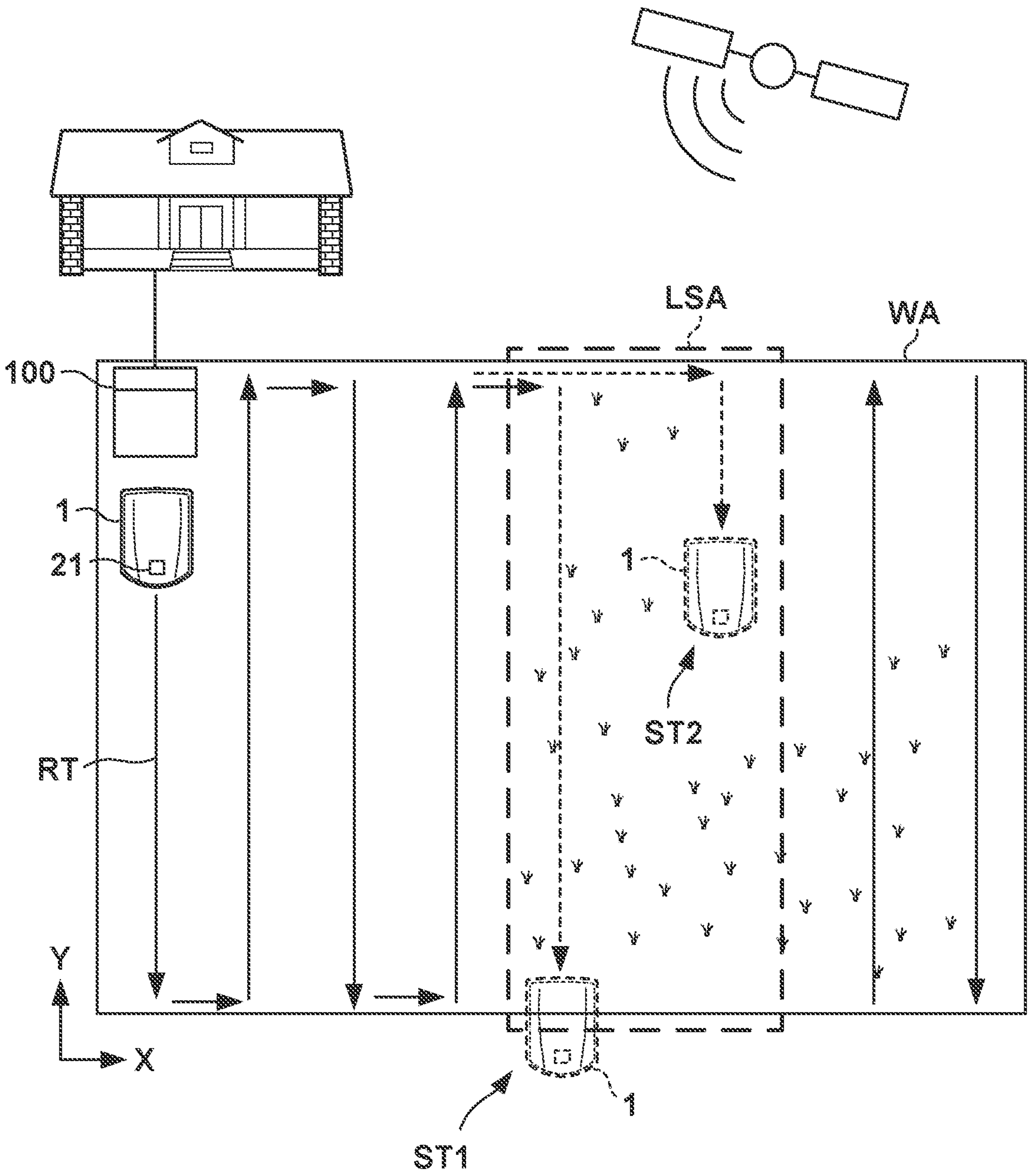
FIG. 3B is a schematic diagram illustrating a movement example of the autonomous working machine in an area where reception strength is low.

An area where the reception strength of the GNSS signals is low may be present because of a surrounding environment of the working site WA (for example, a high building near the working site, a depressed ground of the working site, and the like). In a case where the reception strength of the GNSS signals is low, the recognition accuracy of the current location of the working machine 1 decreases. In a case where such an area where the reception strength is low is present in the working site WA, the movement of the working machine 1 becomes unstable in some cases. FIG. 3B illustrates an example of behaviors of the working machine 1 in the area where the reception strength is low.

In the illustrated example, an area LSA where the reception strength of the GNSS signals is low is present near the center of the working site WA. When the working machine 1 enters the area LSA, the recognition accuracy of the current location decreases, and thus symptoms such as a state ST1 and a state ST2 can occur. The state ST1 is an example in which the working machine 1 deviates (overruns) from the land boundary of the working site WA. In such a state, the working machine 1 cannot return to the charging station 100 by itself in some cases. The state ST2 is an example in which a movement amount in X direction is larger than the original movement amount, when the working machine 1 makes a turn in the course. In such a state, the lawn is partially left uncut, and the work quality is lowered.

In order to avoid such a situation, in the present embodiment, the movement path RT of the working machine 1 is set in accordance with the reception strength of the GNSS signals on the working site WA. FIGS. 4A to 5B illustrate such examples.

Figure 4B:
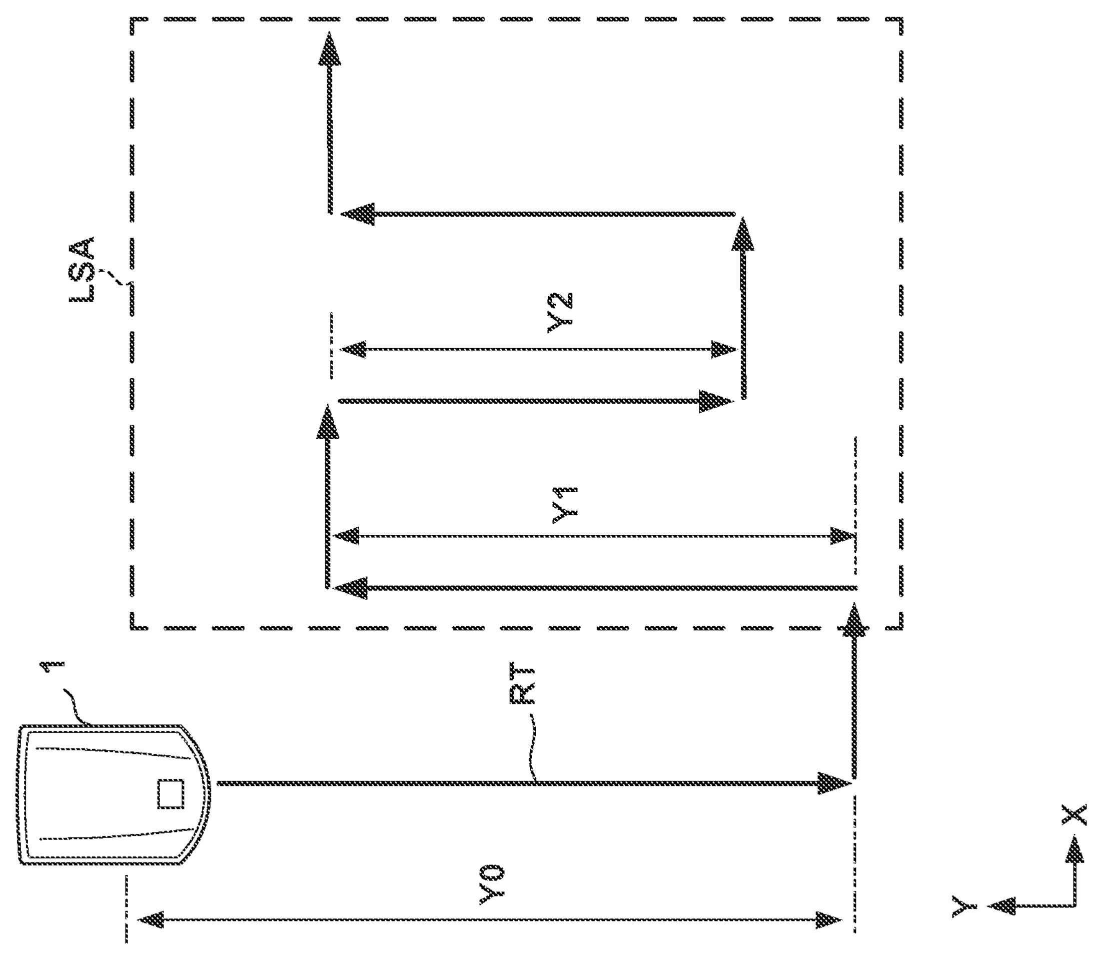
FIGS. 4A and 4B are schematic diagrams each illustrating a setting example of a movement path in an area where the reception strength is low.
Figure 4A:
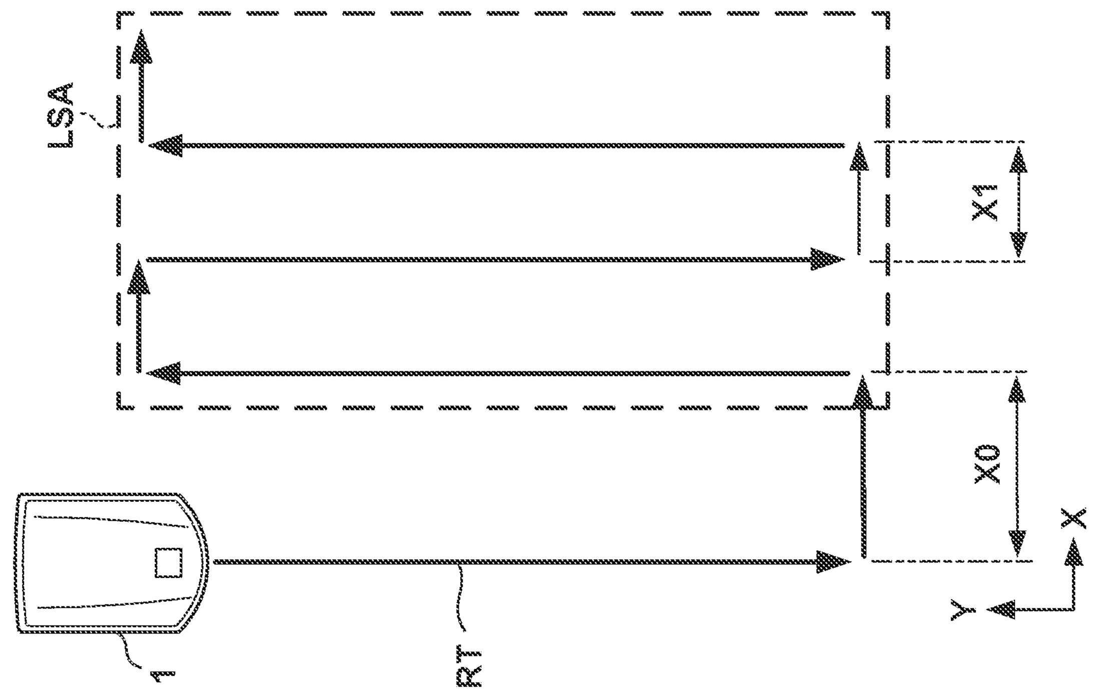

FIG. 4A illustrates an example of shortening (narrowing) a movement pitch in X direction of the working machine 1 in the area LSA. In a regular area, the movement pitch in X direction of the working machine 1 is set to a pitch X0, whereas in the area LSA, the movement pitch is set to a pitch X1 shorter than the pitch X0. The pitch X1 is, for example, about a half of a cutting width (the pitch X0) of the working machine 1. By setting the movement path RT in the area LSA in this manner, even in the case where the recognition accuracy of the current location of the working machine 1 is lowered and the actual movement pitch becomes longer than the movement pitch defined by the movement path RT, the original movement pitch is short, and thus it is possible to suppress the actual movement pitch from largely deviating from the cutting width of the working machine 1. Therefore, it is possible to suppress the lawn from being partially left uncut.

FIG. 4B illustrates an example in which a movement stroke in Y direction of the working machine 1 is shortened in the area LSA. In a regular area, the movement stroke in Y direction of the working machine 1 is set to a stroke Y0, whereas in the area LSA, the movement stroke in Y direction of the working machine 1 is set to strokes Y1 and Y2 shorter than the stroke Y0. The stroke Y1 is a stroke in a transition period immediately after switching from the stroke Y0, and the stroke Y2 is a stroke continuously set after the transition (Y1>Y2). The strokes Y1 and Y2 are set such that the working machine 1 makes a turn in the course at a location away from the land boundary of the working site WA. By setting the movement path RT in the area LSA in this manner, even in the case where the recognition accuracy of the current location of the working machine 1 is lowered and the actual movement stroke becomes longer than the movement stroke defined by the movement path RT, the original movement stroke is short, and thus it is possible to suppress the working machine 1 from deviating from a working land of the working site WA. Therefore, the working machine 1 can be more reliably kept in the working site WA. Note that in the case of this example, in the vicinity of the boundary of the working land of the working site WA, the lawn is partially left uncut in some cases. It is assumed that the lawn mowing work in the vicinity of the boundary is conducted by another method or by another working machine different from the working machine 1.

Figure 5B:
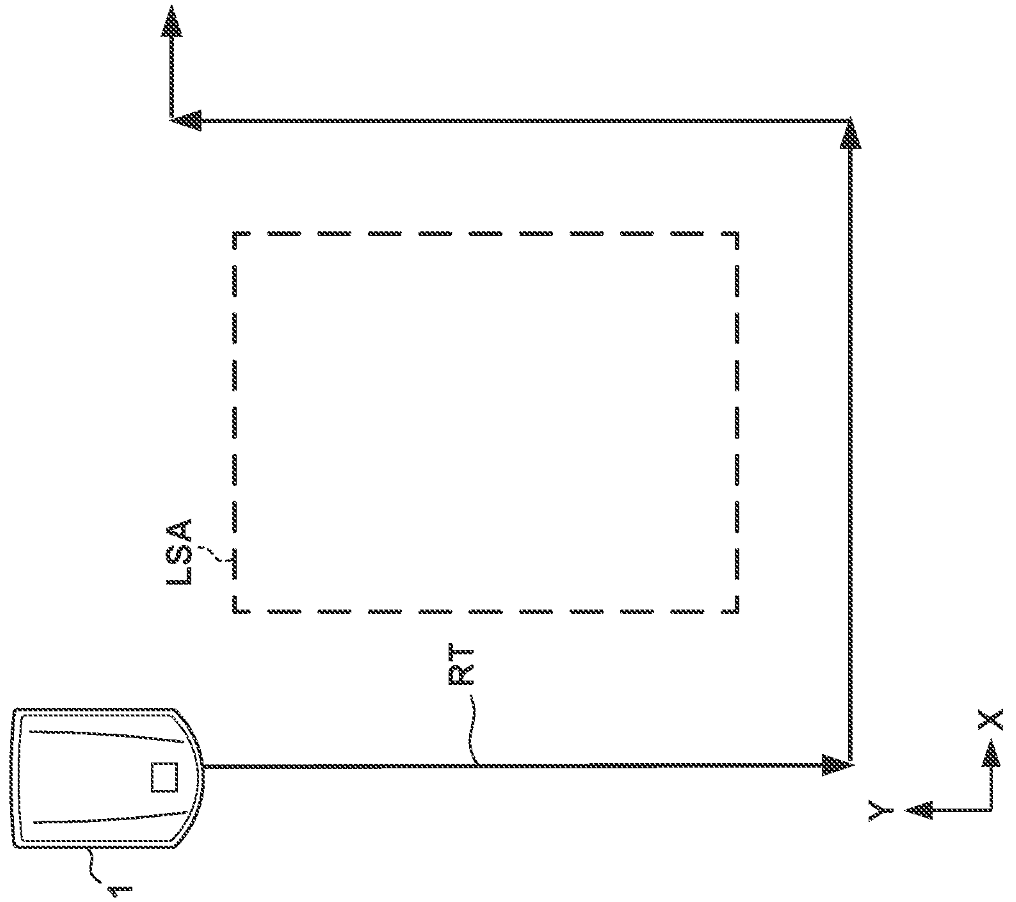
FIGS. 5A and 5B are schematic diagrams each illustrating a setting example of the movement path in the area where the reception strength is low.
Figure 5A:
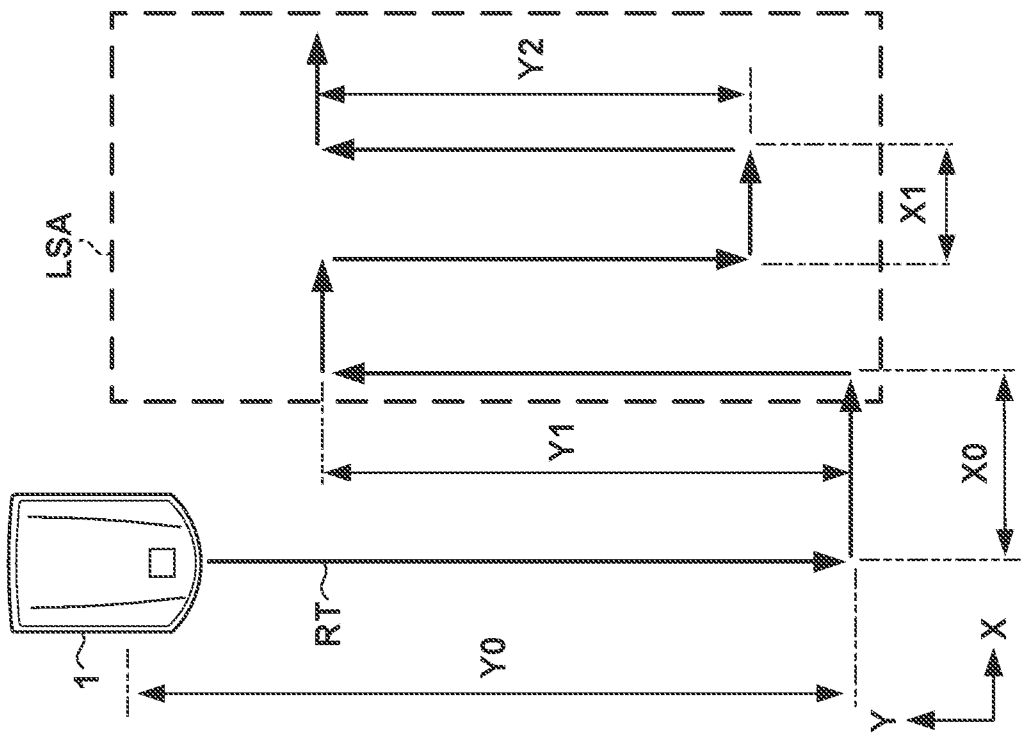

FIG. 5A is an example of shortening the movement pitch in X direction and also shortening the movement stroke in Y direction of the working machine 1, in the area LSA. FIG. 5A is an example of combining the example of FIG. 4A and the example of FIG. 4B.

FIG. 5B illustrates an example of setting the movement path RT avoiding the area LSA. By setting the movement path RT to bypass the area LSA, the working machine 1 is prevented from entering the area LSA. It is assumed that the lawn mowing work in the area LSA is conducted by another method or by another working machine different from the working machine 1.

Setting Process Example

Figure 6A:
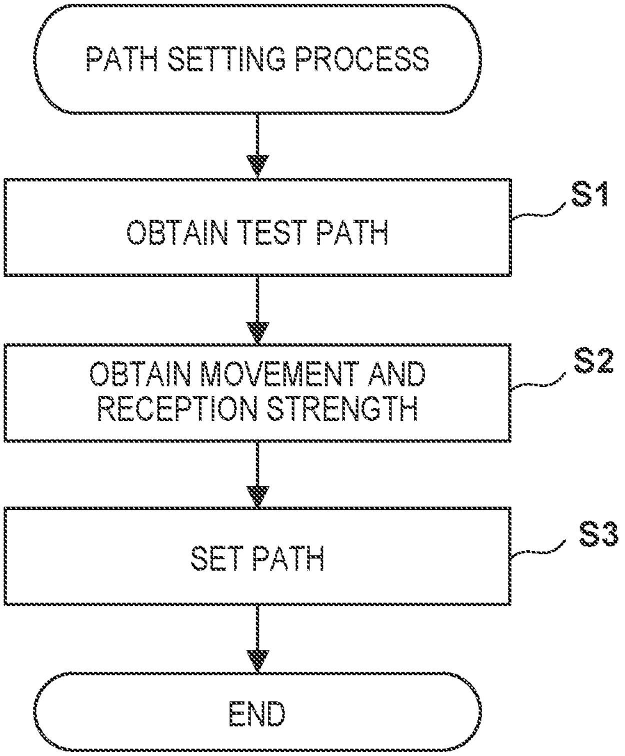
FIG. 6A is a flowchart illustrating an example of a path setting process.

A setting process example of the movement path RT will be described. In the present embodiment, distribution information of the reception strength of the GNSS signals in the working site WA is obtained in a test run of the working machine 1, and the controller 10 sets the movement path RT beforehand from the distribution information that has been obtained. That is, the controller 10 functions as a path setting apparatus, and sets the movement path RT in consideration of the area LSA beforehand, before the working machine 1 works. FIG. 6A is a flowchart illustrating a path setting process performed by the processing unit 11.

In S1, information of a test path is obtained. The test path denotes a path for the working machine 1 to move without conducting the lawn mowing work in order to obtain the distribution information of the reception strength of the GNSS signals in the working site WA, and includes information of locations through which the working machine 1 should pass.

Figure 6B:
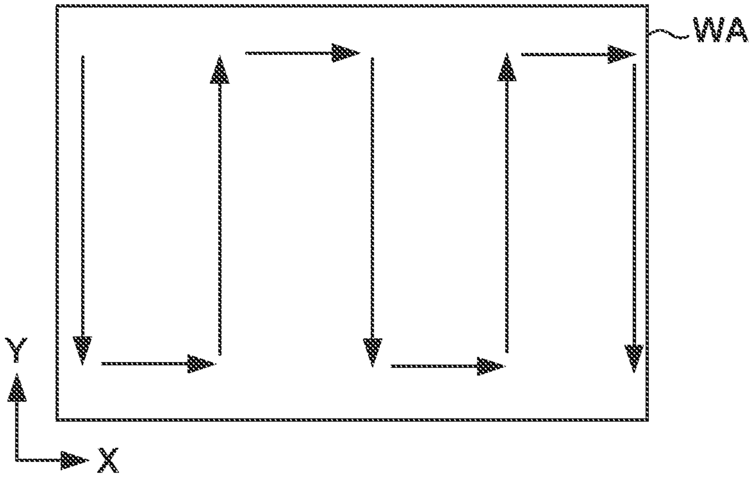
FIG. 6B is a schematic diagram illustrating a test path.

The information of the test path may be stored beforehand in the storage unit 12, may be obtained by being read from the storage unit 12, or may be obtained by being downloaded from the management server 201. The test path may be the same path as the movement path that has been prepared as a default path (hereinafter, referred to as a standard movement path RT0). However, in order to complete the test run in a short time, the test path may be a path with the movement pitch in X direction or the movement stroke in Y direction longer than those of the standard movement path RT0. FIG. 6B is a schematic diagram illustrating a test path with arrows. It is assumed that the illustrated test path is the path with the movement pitch in X direction or the movement stroke in Y direction longer than those of the standard movement path RT0, so that the test run can be ended in a short time.

In S2, the working machine 1 is made to move along the test path read in S1. Here, the movement of the working machine 1 is controlled along the test path with reference to the current location information that has been obtained from the GNSS receiver 21. Then, the reception strength of the GNSS signals and the current location information are obtained from the GNSS receiver 21 during the movement, and are stored in the storage unit 12 in association with each other. The stored information becomes the distribution information of the reception strength indicating the distribution of the reception strength of the GNSS signals in the working site WA. When the working machine 1 reaches an end point of the test path, the process proceeds to S3.

In S3, the movement path RT is set. In setting the movement path RT, the working site WA is distinguished between the area LSA in which the reception strength of the GNSS signals is lower than a predetermined threshold and an area HSA in which the reception strength of the GNSS signals is equal to or higher than the threshold, with reference to the distribution information of the reception strength obtained in S2. A comparison target of the threshold is, for example, an average value or a weakest value of GNSS signals from a plurality of GNSS satellites. Then, the standard movement path RT0 is applied to the area HSA. The standard movement path RT0 is not applied to the area LSA and is changed.

Note that the area distinction based on the reception strength is not limited to the distinction between areas on two stages as described above, and may be made among a plurality of areas including three or more stages in accordance with a plurality of setting thresholds. Then, for example, in a case where the working site WA is distinguished between a plurality of areas, a plurality of standard movement paths RT0 having different movement pitches or movement strokes may be applied in accordance with the plurality of areas, so that the movement path RT may be set for further improving the recognition accuracy of the location of the working machine 1.

Figure 7A:
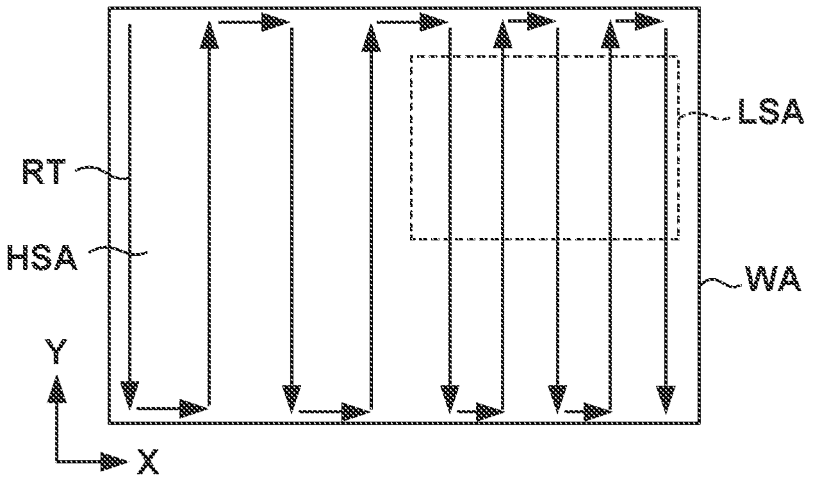
FIGS. 7A and 7B are schematic diagrams each illustrating a setting example of the movement path.

FIG. 7A illustrates a setting example of the movement path RT. In the illustrated example, a movement pitch reduction in X direction illustrated in FIG. 4A is applied to the area LSA, and accordingly, a movement pitch reduction in X direction is similarly applied to a part of the area HSA adjacent to the area LSA in Y direction. The movement path RT that has been set is stored in the storage unit 12.

When the movement path RT is set by the test run in this manner, the lawn mowing work is then conducted. In the lawn mowing work, the controller 10 controls driving of the working machine 1, based on the GNSS signal that has been received by the GNSS receiver 21, so that the working machine 1 conducts the work while moving along the movement path RT that has been set in the path setting process.

Figure 7B:
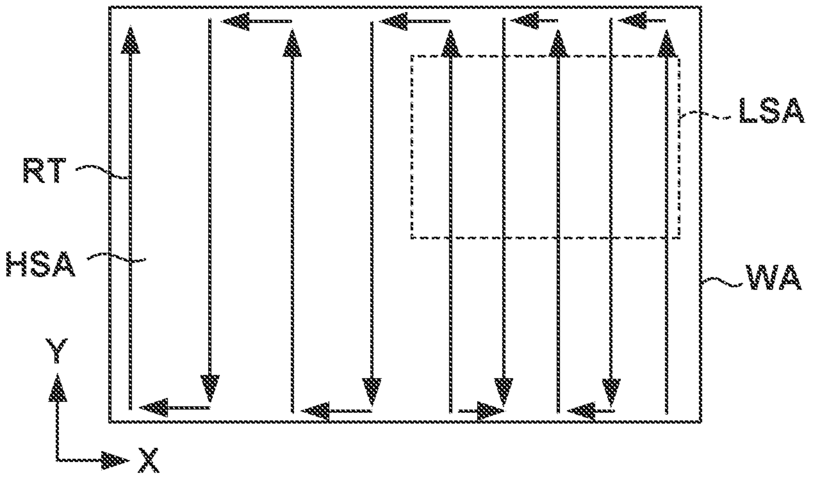

Note that in a case where the lawn mowing work is continuously conducted after the test run, the movement path RT may be set so that the work can be started from an end point of the test path. FIG. 7B illustrates a setting example of such a movement path RT. The difference from the example of FIG. 7A is only the traveling direction of the working machine 1. According to the example of FIG. 7B, after the test run, the lawn mower 1 is capable of transitioning to the lawn mowing work in a continuous manner without returning to the charging station 100.

The path setting process in FIG. 6A may be performed whenever the lawn mowing work is conducted, or may be conducted on a regular basis. In the case of conducting the work on a regular basis, the reference period may be a date and time or the number of times of the lawn mowing work. For example, the path setting process may be performed once in several weeks or several months, and the same movement path RT may be adopted in the lawn mowing work during the period. In addition, the path setting process may be performed once per a plurality of lawn mowing works.

As described above, according to the present embodiment, regarding the movement of the autonomous working machine 1, it is possible to reduce the influence of the reception situation of the GNSS signal. The movement path RT is set before the work, and thus it is also advantageous in that a work plan is easily made.

Second Embodiment

Figure 8:
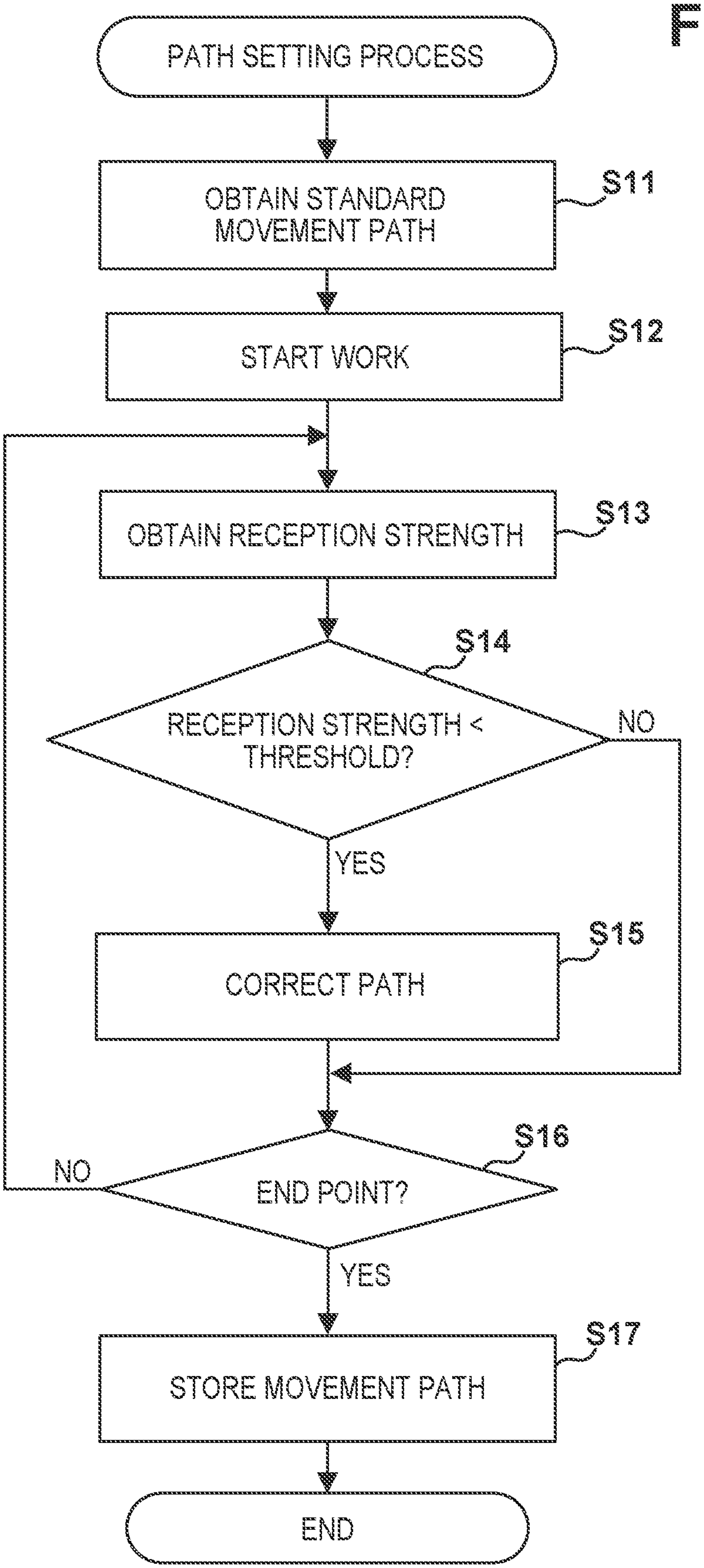
FIG. 8 is a flowchart illustrating a control example of the autonomous working machine of FIG. 1.

In the first embodiment, the movement path RT is set before the start of the lawn mowing work. However, the movement path RT may be set, while the lawn mowing work is being conducted. FIG. 8 is a process example illustrating such an example, and is a flowchart of a path setting process performed by the processing unit 11.

In S11, the standard movement path RT0 is obtained. The information of the standard movement path RT0 may be stored beforehand in the storage unit 12 to be obtained by being read from the storage unit 12, or may be obtained by being downloaded from the management server 201.

In S12, the lawn mowing work is started. In the lawn mowing work, the controller 10 controls driving of the working machine 1, based on the GNSS signal that has been received by the GNSS receiver 21, so that the working machine 1 conducts the work while moving along the standard movement path RT0.

In S13, the reception strength of the GNSS signal is obtained from the GNSS receiver 21, while the working machine 1 is moving. In S14, it is determined whether the reception strength obtained in S13 is less than a predetermined threshold. In other words, it is determined whether the working machine 1 has reached the area LSA. As described above, the comparison target of the threshold is, for example, the average value or the weakest value of the GNSS signals from the plurality of GNSS satellites. In a case where the reception strength is lower than the threshold, the process proceeds to S15, and in a case where the reception strength is equal to or higher than the threshold, the process proceeds to S16.

In S15, the standard movement path RT0 is corrected. Here, the subsequent movement path is changed like the movement path in the area LSA illustrated in FIGS. 4A to 5B. For example, in a case where the movement pitch in X direction is changed as illustrated in FIG. 4A, the movement pitch is shortened from the time when a turn is made in the course next time. In addition, in a case where the movement stroke in Y direction is changed as illustrated in FIG. 4B and the working machine 1 is moving in Y direction, the movement stroke is immediately shortened. Further, in a case where the working machine 1 is made to bypass the area LSA as illustrated in FIG. 5B, for example, the working machine 1 is made to move straight in X direction. In this manner, the movement path is corrected and set in real time, while the working machine 1 is moving.

In S16, it is determined whether the working machine 1 has reached an end point of the standard movement path RT0 (whether the working machine 1 has completed the work). In a case where the working machine 1 has reached the end point of the standard movement path RT0, the process proceeds to S17. In a case where the working machine 1 has not reached the end point of the standard movement path RT0, the process returns to S13, and the same process is repeated. A process cycle of S13 to S15 is set to an extent that the movement path RT is not unnecessarily changed by a correction, and may be performed, for example, once in the reciprocating movement or once in one way, in Y direction of the working machine 1.

In S17, the movement path RT that has been set in the working machine 1 in the current work is stored in the storage unit 12. The movement path RT that has been stored can be used as the movement path RT for a next or subsequent work. In this case, it is no longer necessary to perform the process of FIG. 8 during the work. It is needless to say that the process of FIG. 8 may be performed every time at the work.

As described above, according to the present embodiment, regarding the movement of the autonomous working machine 1, it is possible to reduce the influence of the reception situation of the GNSS signal. The movement path RT is set while the work is being conducted, it is possible to flexibly handle a change in the reception situation of the GNSS signal.

Third Embodiment

In the case where the movement stroke in Y direction is shortened as illustrated in FIG. 4B, an unworked area is generated in the vicinity of the land boundary of the working site WA. Similarly, in the case where the area LSA is bypassed as the example of FIG. 5B, an unworked area is generated in the area LSA.

Figure 9A:
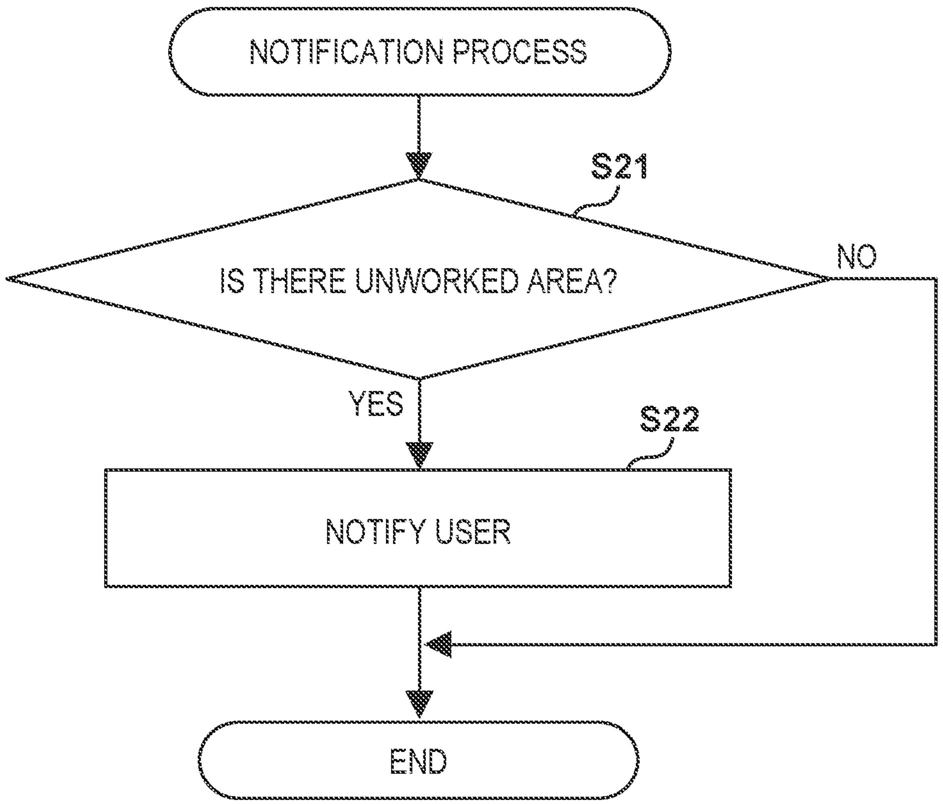
FIG. 9A is a flowchart illustrating an example of a notification process.

In a case where such an unworked area is present, a notification of the unworked area is given to the user, so that the user can conduct a subsequent work to handle the unworked area. FIG. 9A is a process example illustrating such an example, and is a flowchart of a notification process performed by the processing unit 11. The notification process in the drawing is performed, for example, at the time when the working machine 1 completes the work in the working site WA.

In S21, it is determined whether an unworked area is present in the working site WA. The presence or absence of the unworked area can be specified from the movement path RT in the current work, and the unworked area is, for example, an area where the standard movement path RT0 has been changed for the area LSA. In a case where it is determined that the unworked area is present, the process proceeds to S22, and in a case where it is determined that no unworked area is present, the process ends.

Figure 9B:
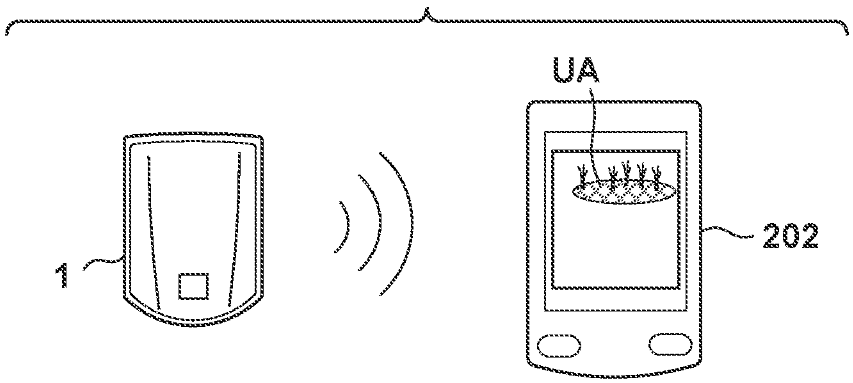
FIG. 9B is a schematic diagram illustrating a notification mode.

In S22, a notification that the unworked area is present is given to the mobile terminal 202 of the user. Specifically, the communication unit 17 transmits the notification including information indicating the location of the unworked area to the mobile terminal 202 via the communication network 200. The user is able to specify the location of the unworked area by referring to the information that has been received by the mobile terminal 202. FIG. 9B illustrates an example of a notification mode. On the display screen of the mobile terminal 202, an image indicating the location of the unworked area UA is displayed. The user is able to know the unworked area UA from this notification, and for example, is able to conduct the lawn mowing work of the unworked area UA by oneself.

Note that in the examples of FIGS. 9A and 9B, the process of directly notifying the mobile terminal 202 from the working machine 1 has been given as an example. However, the notification may be given via the management server 201. That is, in S22, the information indicating that the unworked area is present is transmitted from the working machine 1 to the management server 201. Then, the management server 201 notifies the mobile terminal 202 that the unworked area is present.

Figure 10A:
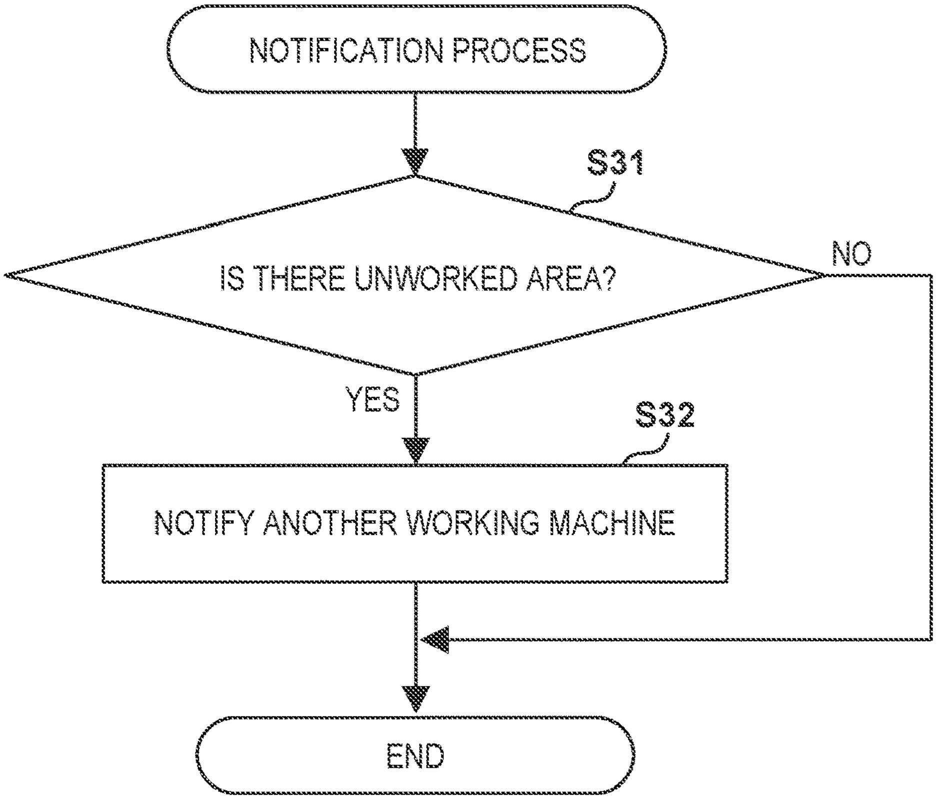
FIG. 10A is a flowchart illustrating an example of another notification process.

Next, in a case where the working site WA is divided so that a plurality of working machines 1 conduct the work, a notification may be given to another working machine 1 to conduct the work in the unworked area. FIG. 10A is a process example illustrating such an example, and is a flowchart of the notification process performed by the processing unit 11. The notification process in the drawing is performed, for example, at the time when the working machine 1 completes the work in the working site WA.

In S31, it is determined whether the unworked area is present in the working site WA. The determination method is the same as the method described in S21. In a case where it is determined that the unworked area is present, the process proceeds to S32, and in a case where it is determined that no unworked area is present, the process ends.

In S32, a notification of the unworked area is given to another working machine that conducts the lawn mowing work on the working site WA. Specifically, the communication unit 17 transmits the notification including the information indicating the location of the unworked area to another working machine via the communication network 200. Such another working machine refers to the information that has been received to specify the location of the unworked area, and moves for the work.

Figure 10B:
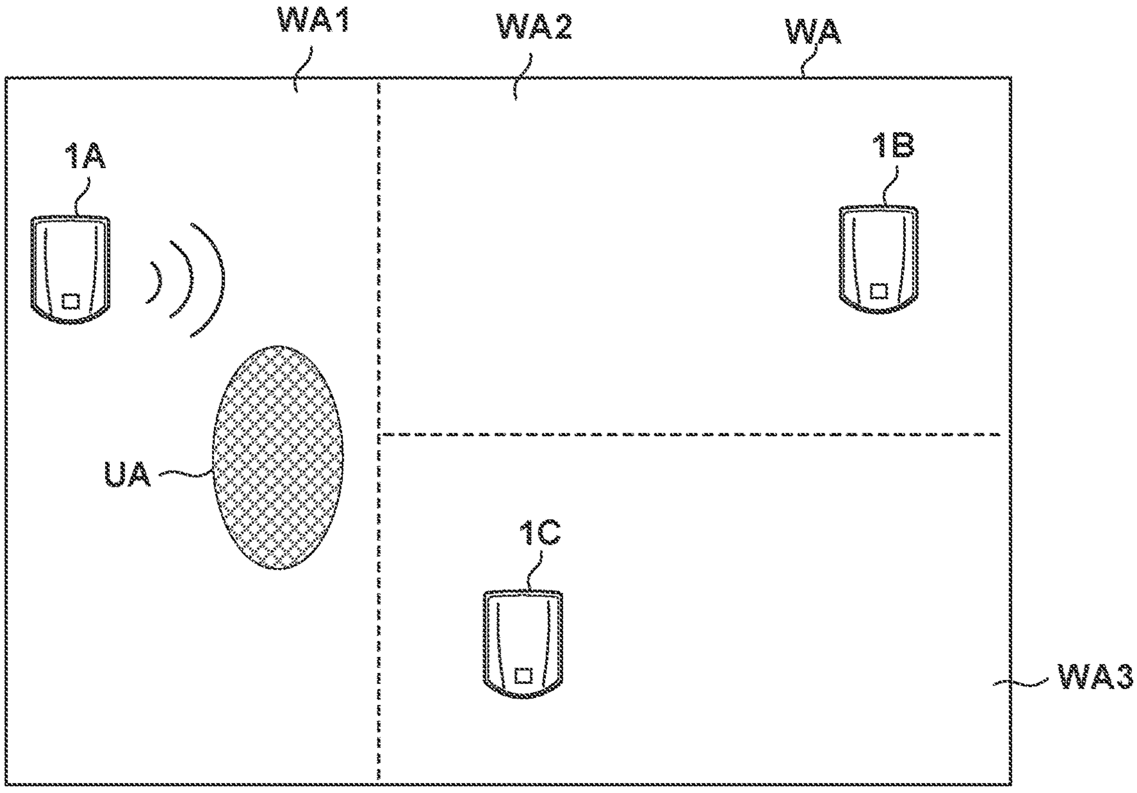
FIG. 10B is a schematic diagram illustrating a notification mode.

FIG. 10B illustrates an example of a notification mode. In the illustrated example, it is assumed that the working site WA is virtually divided into three areas WA1, WA2, and WA3, and working machines 1A, 1B, and 1C work in the respective areas. The working machines 1A to 1C each basically have a similar configuration to the working machine 1 described above. In a case where the unworked area UA is present in the work area WA1 of the working machine 1A, the working machine 1A transmits a notification to the working machine 1B or the working machine 1C to take over the work.

Here, the unworked area UA is an area where the reception strength of the GNSS signal is low, and is an area where the location recognition accuracy is insufficient with the performance of the working machine 1A. It may be difficult for a working machine having almost the same performance as that of the working machine 1A to conduct the work in the unworked area UA. Therefore, a working machine including a GNSS receiver with higher accuracy than that of the working machine 1A or a working machine capable of conducting a highly accurate work without using the GNSS signal (for example, a working machine equipped with a simultaneous localization and mapping (SLAM) technique) is suitable as a working machine that is a notification destination. SLAM refers to a technique for simultaneously conducting self-location estimation and environmental map creation. The working machine equipped with the SLAM technique is capable of map creation of the unworked area UA and self-location estimation, and is capable of conducting the work in the unworked area UA, based on the map information.

For example, regarding the working machine 1B and the working machine 1C, in a case where the GNSS receiver of the working machine 1B is almost the same as that of the working machine 1A and the GNSS receiver of the working machine 1C has high accuracy, a notification is transmitted to the working machine 1C. The working machine 1C is capable of recognizing the current location of the working machine 1C itself with high accuracy even in the unworked area UA, and conducting the lawn mowing work.

Note that the information regarding the performance of the GNSS receiver of each working machine may be managed by the management server 201, and the controller 10 may download the information from the management server 201.

Further, in the examples of FIGS. 10A and 10B, the process of directly notifying the working machine 1B or 1C from the working machine 1A has been given as an example, but the notification may be given via the management server 201. That is, in S32, information indicating that the unworked area is present is transmitted from the working machine 1 to the management server 201. Then, the management server 201 notifies another working machine including a GNSS receiver with higher accuracy than the GNSS receiver included in the working machine 1 that the unworked area is present, and causes such another working machine to conduct the work.

Fourth Embodiment

In the first and second embodiments, the example in which the controller 10 of the working machine 1 sets the movement path RT has been given. However, the management server 201 may set the movement path RT. That is, a mode in which the management server 201 functions as a path setting apparatus is also adoptable.

Figure 11:
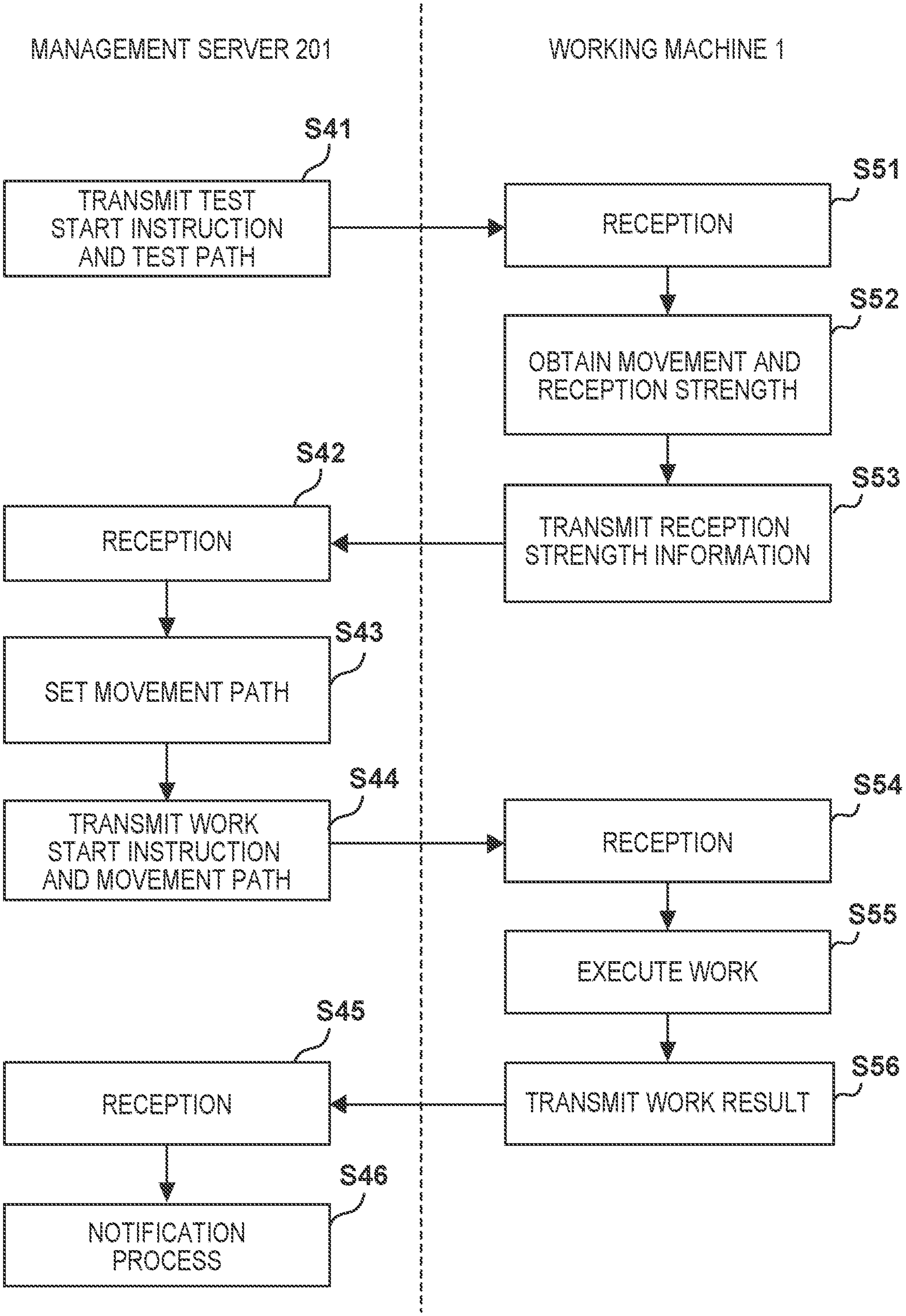
FIG. 11 is a flowchart illustrating an example of a movement path setting process by a management server.

FIG. 11 is a flowchart illustrating a process example in which the management server 201 sets the movement path RT, and is a flowchart illustrating respective process examples of the processing unit 211 of the management server 201 and the processing unit 11 of the working machine 1. The example of FIG. 11 is an example of setting a movement path beforehand, before starting the work, in a similar manner to the first embodiment.

In S41, the management server 201 transmits a start instruction of a test run and a test path to the working machine 1 in order to obtain distribution information of reception strength of the GNSS signals in the working site WA. The working machine 1 receives the start instruction and the test path in S51, and starts the test run in S52. The process is the same as S2 in the first embodiment. In S53, the working machine 1 transmits, to the management server 201, the distribution information of the reception strength obtained by the test run in S52.

In S42, the management server 201 receives the distribution information of the reception strength. In this manner, the management server 201 is capable of obtaining the information of the reception strength of the GNSS signals at the working machine 1. In S43, the management server 201 sets the movement path RT of the working machine 1. The process is the same as S3 in the first embodiment. In S44, the management server 201 transmits, to the working machine 1, a work start instruction for the working site WA and information of the movement path RT set in S43.

The working machine 1 receives the instruction and the information in S54, and starts the work in S55. In S55, the controller 10 controls driving of the working machine 1, based on the GNSS signal that has been received by the GNSS receiver 21 so that the working machine 1 conducts the work while moving along the movement path RT received in S54. When the working machine 1 reaches the end point of the movement path RT and completes the work, the working machine 1 transmits a work result to the management server 201 in S56. In a case where the unworked area UA is present, the work result includes information of the unworked area UA.

The management server 201 receives the work result in S45, and performs a notification process in S46. The notification process is to notify the mobile terminal 202 of the user of completion of the work. In addition, in a similar manner to the third embodiment, the notification process includes a process of notifying the mobile terminal 202 of the user or another working machine of the information of the unworked area UA.

As described above, the management server 201 is capable of setting the movement path RT. In this mode, in a case where a plurality of working machines 1 share the work in the working site WA, it is advantageous in that the management server 201 is capable of collectively setting the movement paths of the respective working machines 1.

Figure 12:
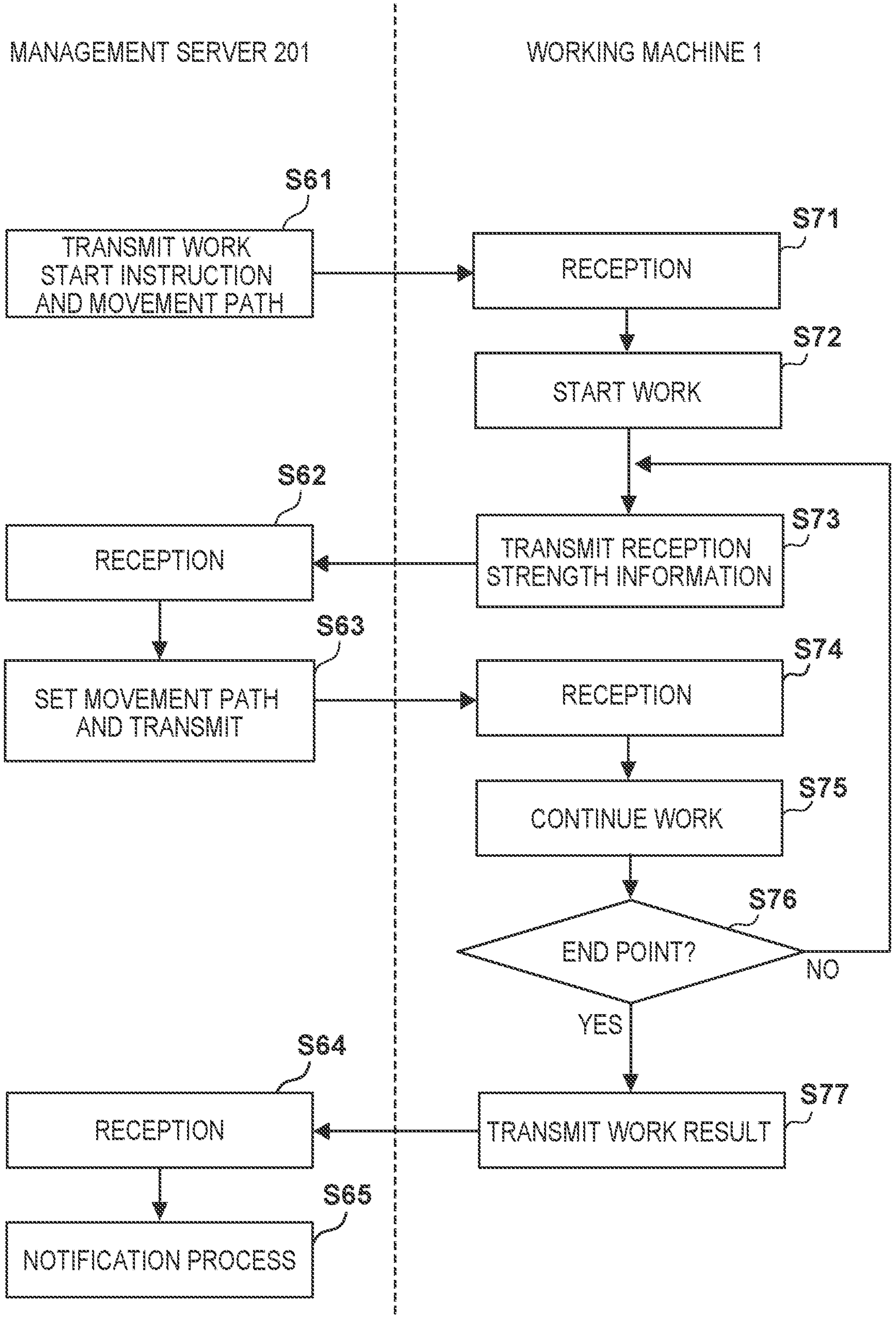
FIG. 12 is a flowchart illustrating an example of the movement path setting process by the management server.

Next, FIG. 12 also illustrates a process example in which the management server 201 sets the movement path RT, and is a flowchart illustrating respective process examples of the processing unit 211 of the management server 201 and the processing unit 11 of the working machine 1. The example of FIG. 12 is an example in which a movement path is set while the work is being conducted, in a similar manner to the second embodiment.

In S61, the management server 201 transmits, to the working machine 1, a work start instruction for the working site WA and information of the movement path RT. The movement path RT to be transmitted is the standard movement path RT. However, it is not necessary to transmit all the paths. At least a range of a predetermined movement distance from the work start (for example, one reciprocating movement or a plurality of reciprocating movements) may also be transmitted.

The working machine 1 receives the instruction and the information in S71, and starts the work in S72. During the work, the controller 10 controls driving of the working machine 1, based on the GNSS signal, so as to cause the working machine 1 to conduct the work, while causing the working machine 1 to move along the movement path RT that has been received.

In S73, the working machine 1 transmits, to the management server 201, the information of the reception strength of the GNSS signal that has been obtained from the GNSS receiver 21. In S62, the management server 201 receives the information of the reception strength of the GNSS signal. In this manner, the management server 201 is capable of obtaining the information of the reception strength of the GNSS signals at the working machine 1.

In S63, the management server 201 sets the movement path RT, based on the information of the reception strength received in S62, and transmits the movement path RT to the working machine 1. The process here is the same as the processes of S14 and S15 in the second embodiment, and the reception strength is compared with a predetermined threshold. In a case where the reception strength is lower than the threshold, the path obtained by changing the standard movement path RT0 is set as the movement path RT, and in a case where the reception strength is equal to or higher than the threshold, the standard movement path RT0 is set as the movement path RT. The movement path RT to be transmitted here may be at least a range of a predetermined movement distance (for example, one reciprocating movement or a plurality of reciprocating movements).

The working machine 1 receives the movement path RT in S74, and continues the work, based on the movement path RT received in S75. In S76, the working machine 1 determines whether the working machine 1 has reached the end point of the movement path RT and has completed the work. When the working machine 1 determines that the working machine 1 has completed the work, the process proceeds to S77. When the working machine 1 determines that the working machine 1 has not completed the work, the process returns to S73, and the same process is repeated. A process cycle of S73 to S76 may be performed, for example, once in the reciprocating movement or once in one way, in Y direction of the working machine 1. In S77, the working machine 1 transmits a work result to the management server 201. In a case where the unworked area UA is present, the work result includes information of the unworked area UA.

The management server 201 receives the work result in S64, and performs a notification process in S65. This process is the same as S45 and S46 in FIG. 11.

As described above, the management server 201 is capable of setting the movement path RT in real time, while the working machine 1 is conducting the work.

Fifth Embodiment

In the first embodiment and the fourth embodiment, the description has been given with regard to the example in which the working machine 1 obtains the distribution information of the reception strength in the working site WA from the GNSS receiver 21 included in the working machine 1. However, the distribution information of the reception strength in the working site WA may be information separately measured by the user and stored in the storage unit 12 or the storage unit 212. Alternatively, the distribution information may be obtained from a provider that provides information of the reception strength on the ground via an information providing server managed by the provider.

Another Embodiment

A program executed by the processing unit 11 or the processing unit 211 may be installed and executed by the controller 10 or the management server 201 via a storage medium such as a CD-ROM.

Summary of Embodiments

The above-described embodiments disclose at least a path setting apparatus, a path setting method, a storage medium, and a program, as follows.

1. The path setting apparatus (10 and 201 in FIG. 2), of the embodiment, for an autonomous working machine (1 in FIG. 1) that autonomously conducts a work with moving in a working site while recognizing a current location based on a GNSS signal, includes an obtaining unit (11 and 211 in FIG. 2) configured to obtain information regarding reception strength of the GNSS signal on the working site, and a setting unit (11 and 211 in FIG. 2) configured to set a movement path of the autonomous working machine in the working site based on the information obtained by the obtaining unit.

According to the embodiment, the movement path is set in accordance with the reception strength of the GNSS signal. Therefore, it is possible to reduce the influence of the reception situation of the GNSS signal with regard to movements of the autonomous working machine.

2. In the embodiment, the setting unit is configured to set the movement path such that:

while the autonomous working machine is reciprocating in a first direction in the working site, the autonomous working machine moves in a second direction that intersects the first direction; and a movement pitch in the second direction is shorter in an area where the reception strength is lower than a threshold than a movement pitch in an area where the reception strength is equal to or higher than the threshold, in the working site (FIGS. 4A and 5A).

According to this embodiment, the movement pitch is shortened in the second direction in the area where the reception strength of the GNSS signal is low. Therefore, it is possible to reduce an occurrence of an unfinished work of the autonomous working machine.

3. In the embodiment, the setting unit is configured to set the movement path such that:

while the autonomous working machine is reciprocating in a first direction in the working site, the autonomous working machine moves in a second direction that intersects the first direction; and a movement stroke in the first direction is shorter in an area where the reception strength is lower than a threshold than a movement stroke in an area where the reception strength is equal to or higher than the threshold, in the working site (FIGS. 4B and 5A).

According to this embodiment, the movement stroke of the autonomous working machine is shortened in the first direction in the area where the reception strength of the GNSS signal is low. Therefore, it is possible to suppress an overrun of the autonomous working machine.

4. In the above-described embodiment, the setting unit is configured to set a movement path to avoid an area where the reception strength is lower than a threshold in the working site (FIG. 5B).

According to this embodiment, the area where the reception strength of the GNSS signal is low is bypassed. Therefore, it is possible to avoid the autonomous working machine from moving on an unintended path.

5. The path setting apparatus of the embodiment further includes a notification unit (11 and 211 in FIG. 2) configured to notify a user's terminal of the area (FIGS. 9A and 9B).

According to this embodiment, the user is able to recognize that the unworked area is present.

6. In the above-described embodiment, the obtaining unit is configured to obtain the information while the autonomous working machine is conducting the work, and the setting unit is configured to, when the autonomous working machine reaches an area where the reception strength is lower than a threshold in the working site, change the movement path predetermined before the autonomous working machine starts the work (FIGS. 8 and 12).

According to this embodiment, it is possible to change the movement path, while the autonomous working machine is conducting the work, and it is possible to flexibly handle a change in the reception strength of the GNSS signal in real time.

7. In the above-described embodiment, the obtaining unit is configured to obtain the information before the autonomous working machine starts the work, and the setting unit is configured to set the movement path in the working site by distinguishing between an area where the reception strength is lower than a threshold and an area where the reception strength is equal to or higher than the threshold, based on the information, before the autonomous working machine starts the work (FIGS. 6A and 11).

According to this embodiment, it is possible to avoid the autonomous working machine from moving on the unintended path beforehand.

8. The path setting apparatus of the embodiment further includes a notification unit configured to notify another autonomous working machine that works in the working site of the area (FIGS. 10A and 10B).

According to this embodiment, it is possible to cause another autonomous working machine to conduct the work on the unworked area.

9. The path setting apparatus of the embodiment further includes a notification unit configured to notify another autonomous working machine that works in the working site of the area, the another autonomous working machine including a GNSS receiver with higher accuracy than the autonomous working machine.

According to this embodiment, it is possible to cause another autonomous working machine having high accuracy in recognition of its own location to work on the unworked area.

10. In the embodiment, the path setting apparatus is configured to be mounted on the autonomous working machine (1 in FIG. 1).

According to this embodiment, the autonomous working machine is capable of conducting the work in the working site, while setting the movement path by itself.

11. In the embodiment, the path setting apparatus is a server (201 in FIG. 2) capable of communicating with the autonomous working machine.

According to this embodiment, the movement of the autonomous working machine is remotely controllable by a server.

12. A path setting method of the embodiment for an autonomous working machine that autonomously conducts a work with moving in a working site while recognizing a current location based on a GNSS signal, include obtaining information regarding reception strength of the GNSS signal on the working site; and setting a movement path of the autonomous working machine in the working site based on the information obtained by the obtaining.

According to this embodiment, the movement path is set in accordance with the reception strength of the GNSS signal. Therefore, it is possible to reduce the influence of the reception situation of the GNSS signal regarding the movement of the autonomous working machine.

13. The storage medium of the embodiment stores a program for causing a computer to execute e the above path setting method.

According to this embodiment, the movement path is set in accordance with the reception strength of the GNSS signal. Therefore, it is possible to reduce the influence of the reception situation of the GNSS signal regarding the movement of the autonomous working machine.

14. The program of the above described embodiment causes a computer to execute the path setting method.

According to this embodiment, the movement path is set in accordance with the reception strength of the GNSS signal. Therefore, it is possible to reduce the influence of the reception situation of the GNSS signal regarding the movement of the autonomous working machine.

The invention is not limited to the foregoing embodiments, and various variations/changes are possible within the spirit of the invention.

What is claimed is:

1. A path setting apparatus for an autonomous working machine that autonomously conducts a work as the autonomous working machine moves in a working site while recognizing a current location based on a global navigation satellite system (GNSS) signal, the path setting apparatus comprising:

at least one processor; and at least one memory coupled to the at least one processor, the at least one memory storing instructions that, when executed by the at least one processor, cause the at least one processor to:

move the autonomous working machine along a test path to obtain information regarding reception strength of the GNSS signal on the working site;

set a movement path of the autonomous working machine in the working site based on the information obtained by the at least one processor, the movement path being set such that the work is started from an end point of the test path; and control the autonomous working machine to move along the movement path, wherein the instructions being configured to cause the at least one processor to set the movement path such that:

while the autonomous working machine is reciprocating in a first direction in the working site, the autonomous working machine moves in a second direction that intersects the first direction; and a movement pitch in the second direction is shorter in an area where the reception strength is lower than a threshold than a movement pitch in an area where the reception strength is equal to or higher than the threshold in the working site, and the autonomous working machine moves in the area where the reception strength is lower than the threshold while recognizing the current location based on the GNSS signal.

2. The path setting apparatus according to claim 1, wherein the instructions further cause the at least one processor to set a movement path to avoid an area where the reception strength is lower than a threshold in the working site.

3. The path setting apparatus according to claim 2, wherein the instructions further cause the at least one processor to notify a user's terminal of the area.

4. The path setting apparatus according to claim 2, wherein the instructions further cause the at least one processor to notify another autonomous working machine that works in the working site of the area.

5. The path setting apparatus according to claim 2, wherein the instructions further cause the at least one processor to notify another autonomous working machine that works in the working site of the area, the another autonomous working machine including a GNSS receiver with higher accuracy than the autonomous working machine.

6. The path setting apparatus according to claim 1, wherein the path setting apparatus is configured to be mounted on the autonomous working machine.

7. The path setting apparatus according to claim 1, wherein the path setting apparatus is a server capable of communicating with the autonomous working machine.

8. A path setting method for an autonomous working machine that autonomously conducts a work as the autonomous working machine moves in a working site while recognizing a current location based on a global navigation satellite system (GNSS) signal, the path setting method comprising:

moving the autonomous working machine along a test path to obtain information regarding reception strength of the GNSS signal on the working site;

setting a movement path of the autonomous working machine in the working site based on the information obtained by the obtaining, the movement path being set such that the work is started from an end point of the test path; and control the autonomous working machine to move along the movement path, wherein the movement path is set such that:

while the autonomous working machine is reciprocating in a first direction in the working site, the autonomous working machine moves in a second direction that intersects the first direction; and a movement pitch in the second direction is shorter in an area where the reception strength is lower than a threshold than a movement pitch in an area where the reception strength is equal to or higher than the threshold in the working site, and the autonomous working machine moves in the area where the reception strength is lower than the threshold while recognizing the current location based on the GNSS signal.

9. A non-transitory computer-readable storage medium storing a program that, when executed by a computer, causes the computer to perform a path setting method for an autonomous working machine that autonomously conducts a work as the autonomous working machine moves in a working site while recognizing a current location based on a global navigation satellite system (GNSS) signal, the path setting method comprising:

moving the autonomous working machine along a test path to obtain information regarding reception strength of the GNSS signal on the working site;

setting a movement path of the autonomous working machine in the working site based on the information obtained by the obtaining, the movement path being set such that the work is started from an end point of the test path; and control the autonomous working machine to move along the movement path, wherein the movement path is set such that:

while the autonomous working machine is reciprocating in a first direction in the working site, the autonomous working machine moves in a second direction that intersects the first direction; and a movement pitch in the second direction is shorter in an area where the reception strength is lower than a threshold than a movement pitch in an area where the reception strength is equal to or higher than the threshold in the working site, the autonomous working machine moves in the area where the reception strength is lower than the threshold while recognizing the current location based on the GNSS signal.

10. A path setting apparatus for an autonomous working machine that autonomously conducts a work as the autonomous working machine moves in a working site while recognizing a current location based on a global navigation satellite system (GNSS) signal, the path setting apparatus comprising:

at least one processor; and at least one memory coupled to the at least one processor, the at least one memory storing instructions that, when executed by the at least one processor, cause the at least one processor to:

obtain information regarding reception strength of the GNSS signal on the working site;

set a movement path of the autonomous working machine in the working site based on the information obtained by the at least one processor; and control the autonomous working machine to move along the movement path, wherein the instructions further cause the at least one processor to set the movement path such that:

while the autonomous working machine is reciprocating in a first direction in the working site, the autonomous working machine moves in a second direction that intersects the first direction; and a movement stroke in the first direction is shorter in an area where the reception strength is lower than a threshold than a movement stroke in an area where the reception strength is equal to or higher than the threshold in the working site, and wherein the instructions further cause the at least one processor to notify another autonomous working machine to conduct the work in an unworked area as a result of the shortened movement stroke in the first direction of the autonomous working machine in the area where the reception strength is equal to or higher than the threshold, the another autonomous working machine including a GNSS receiver with higher accuracy than the autonomous working machine.

11. A path setting method for an autonomous working machine that autonomously conducts a work as the autonomous working machine moves in a working site while recognizing a current location based on a global navigation satellite system (GNSS) signal, the path setting method comprising:

obtaining information regarding reception strength of the GNSS signal on the working site;

setting a movement path of the autonomous working machine in the working site based on the information obtained by the obtaining; and control the autonomous working machine to move along the movement path, wherein the movement path is set such that:

while the autonomous working machine is reciprocating in a first direction in the working site, the autonomous working machine moves in a second direction that intersects the first direction; and a movement stroke in the first direction is shorter in an area where the reception strength is lower than a threshold than a movement stroke in an area where the reception strength is equal to or higher than the threshold in the working site, and wherein the path setting method comprises notifying another autonomous working machine to conduct the work in an unworked area as a result of the shortened movement stroke in the first direction of the autonomous working machine in the area where the reception strength is equal to or higher than the threshold, the another autonomous working machine including a GNSS receiver with higher accuracy than the autonomous working machine.

12. A non-transitory computer-readable storage medium storing a program that, when executed by a computer, causes the computer to perform a path setting method for an autonomous working machine that autonomously conducts a work as the autonomous working machine moves in a working site while recognizing a current location based on a global navigation satellite system (GNSS) signal, the path setting method comprising:

obtaining information regarding reception strength of the GNSS signal on the working site;

setting a movement path of the autonomous working machine in the working site based on the information obtained by the obtaining; and control the autonomous working machine to move along the movement path, wherein the movement path is set such that:

while the autonomous working machine is reciprocating in a first direction in the working site, the autonomous working machine moves in a second direction that intersects the first direction; and a movement stroke in the first direction is shorter in an area where the reception strength is lower than a threshold than a movement stroke in an area where the reception strength is equal to or higher than the threshold in the working site, wherein the path setting method comprises notifying another autonomous working machine to conduct the work in an unworked area as a result of the shortened movement stroke in the first direction of the autonomous working machine in the area where the reception strength is equal to or higher than the threshold, the another autonomous working machine including a GNSS receiver with higher accuracy than the autonomous working machine.

13. The path setting apparatus according to claim 1, wherein the movement path is set to be identical to the test path with a reversed traveling direction when there is no area where the reception strength is lower than the threshold.

* * * * *